United States Patent Office 2,850,511
Patented Sept. 2, 1958

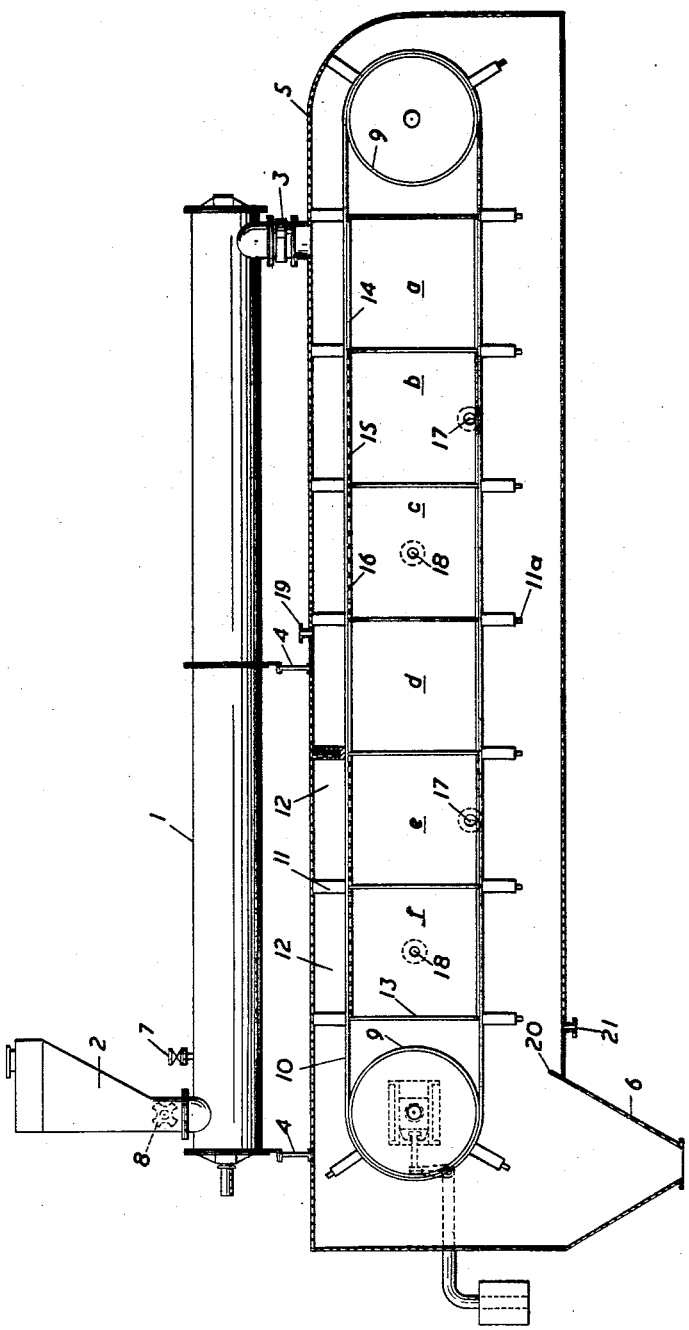

2,850,511
SOLVENT EXTRACTION OF OILS FROM VEGETABLE MATTER

Thomas Andrews, Goole, England, assignor to Rose, Downs & Thompson Limited, Kingston-upon-Hull, England, a British company Continuation of application Serial No. 121,934, October 18, 1949. This application December 16, 1953, Serial No. 398,499

Claims priority, application Great Britain October 20, 1949

9 Claims. (Cl. 260—412.4)

This invention relates to solvent extraction of oils from vegetable matter and is a continuation of my application for United States Letters Patent Serial No. 121,934, filed October 18, 1949, now forfeited.

The grinding of materials such as seeds, beans and nuts which is necessary before the solvent extraction of the oils contained therein can be effected produces a proportion of "fines" which at present causes difficulty in extracting satisfactorily the oil from the solid ground material. Moreover, in the case of those nuts and seeds containing a fine starchy or albuminous solid base in combination with a high oil content grinding may produce a pasty mass through which the extraction solvent penetrates only with difficulty and the economic extraction of the material may be seriously retarded or even prevented. In order to overcome this latter defect it has been found necessary to prepare nuts and seeds of this type prior to the solvent extraction in such a manner that flakes are provided capable of retaining their shape and yet at the same time being thin enough to be readily penetrated by the solvent. Seeds such as typified by the ground nut do not readily lend themselves to such treatment and it has been found necessary to devise a preparation plant which is often more costly in itself and more costly in operation than is the actual extraction plant and its operation.

An object of the present invention is to provide a method for extracting oils from vegetable material such as seeds and nuts wherein the process of extraction is carried out continuously and economically irrespective of the type of seed being treated. A further object is to provide a method for extracting oils from seeds and nuts in which the oils can be economically extracted without regard being paid to the presence of a large proportion of "fines."

According to the present invention a method of extracting oils from vegetable matter such as nuts, beans and seeds comprises the steps of thoroughly mixing together finely ground raw vegetable matter and an extraction solvent so as to form a slurry, then conveying the said slurry through a plurality of zones in which the slurry is subjected successively to filtration by suction to separate miscella from the slurry, and to washing with further extraction solvent.

The slurry may conveniently be conveyed through the zones of differential pressure as a series of contiguous pools.

The solvent used to wash the meal, as the solid product resulting from the vacuum extraction of the slurry will hereinafter be referred to, at any one position need not be clean but may be the miscella obtained by the action of the solvent on the solids at any other position in the circuit. Thus in a circuit calling for three washes, the last wash on removal from the third position may be used to wash the meal in the second position which may in turn be used in the first position and this may be used to form the original slurry. Alternatively, the miscella may be used in any order.

The miscella arising at any point may be removed for distillation to recover separately the oil and the solvent.

According to one preferred embodiment of the invention, after the slurry has been subjected to filtration by suction to separate miscella from the slurry, the solids in the slurry which have become compacted by said suction are subjected to a loosening action before the slurry is washed with further extraction solvent.

Apparatus suitable for extracting oils from vegetable matter such as seeds, nuts and beans in accordance with the invention comprises an enclosed casing having entry ports for slurry and extraction solvent and an exit port for spent meal, a compartment disposed within said casing and partitioned into a plurality of sections with a selected number of such sections having each a reticulated top and having means associated with such selected sections for establishing differences of pressure in successive sections, and a series of contiguous chambers having bottoms formed of a porous or reticulated material constituting a continuous belt conveyor arranged so as to travel in close proximity to the top of the compartment. Those sections of the partitioned compartment having a perforate or reticulate top may be provided with means either for exhausting the section or developing a positive pressure therein.

In a preferred embodiment of the invention, a neutral section is disposed between any two pairs of vacuum/pressure sections over the top of which section the differential pressures previously created in the preceding vacuum/pressure sections of the compartment are allowed to equalise themselves. Any such neutral section has a solid top.

The contiguous slurry-carrying chambers may conveniently be mounted upon a continuous porous belt conveyor which is carried upon drums or rollers disposed at each end of an elongated enclosed casing. The belt conveyor may conveniently be arranged to circumscribe the partitioned compartment. The belt conveyor may be of a width substantially equal to that of the elongated casing and may be provided with a plurality of upstanding plates which bear resiliently against the sides and top of the casing, thus providing a series of contiguous compartments which are substantially slurry-tight but which are not tight to the atmosphere prevailing within the enclosed casing and which utilise the sides of the enclosed casing as the side walls of the contiguous compartments.

The slurry may be made from pulverised seed and a clean solvent, or from pulverised seed and a partially used miscella.

The practice of the present invention will now be more particularly described by reference to the accompanying drawing which represents a diagrammatic representation, partly in section of one specific apparatus suitable for use in connection with the invention.

An elongated enclosed vapour-tight trough 1 having a feed hopper 2 at one end and an oppositely directed discharge pipe 3 at its other end is braced as at 4 to lie substantially parallel to and above the top of an elongated enclosed casing 5 having a discharge hopper 6 for exhausted meal at its end substantially beneath the feed hopper 2 of the trough 1. A throttle-controlled inlet pipe 7 for solvent is disposed near the feed hopper 2. Communication between the feed hopper and the trough is controlled by a vapour-tight rotary valve 8. The enclosed casing 5 is provided with a roller or drum 9 adjacent to each of its ends one of which is adapted to be power driven and this pair of rollers or drums carries a continuous belt 10 of porous or reticulated material which is kept taut by means of any suitable tensioning means (not shown). The width of the continuous belt 10 is substantially the same as that of the enclosed casing within which it moves. A series of interspaced division plates 11 conveniently comprising a spring loaded shutter 11a and which are substantially impervious to attack by solvent, oil or miscella, project outwardly at right angles from the continuous belt and bear resiliently against the sides and upper surface of the enclosed casing, thus constituting, in conjunction with the sides and top of the casing, a series of contiguous chambers 12. A partitioned compartment 13 lies axially within the enclosed casing 5 between the top and bottom webs of the continuous belt and is of a length to occupy substantially the whole of the distance between the drums or rollers 9. The partitioned compartment 13 contains six separate sections a–f. Section a of the partitioned compartment has a solid top 14 whereas sections b and c have perforated or reticulated tops 15 and 16 lying in immediate contact with the continuous porous belt. Sections d, e and f reproduce sections a, b and c respectively. Sections b and e are provided with means for producing a vacuum therein (diagrammatically indicated at 17) and sections c and f with means for developing a pressure therein (diagrammatically indicated at 18). An inlet pipe 19 for fresh solvent or miscella is provided in the top of the enclosed casing immediately above section d. The discharge hopper 6 and a lip 20 extending across the width of the enclosed casing to prevent any slurry which may have leaked out of the charged contiguous chambers on the continuous porous belt into the bottom of the enclosed casing from passing into the hopper and thus contaminating the exhausted meal. A separate discharge pipe 21 is provided in the bottom of the enclosed casing for removal of any such slurry.

The present invention may be practiced utilizing the apparatus described above as follows:

Suitable pulverised seed or other oily material is supplied to the feed hopper 2 from which it passes into the vapour-tight trough 1 through the rotary valve 8. Solvent or miscella is introduced into the trough through the throttle-controlled inlet pipe 7 and the pulverised seed plus solvent or miscella then passes from the hopper to the discharge end of the trough being assisted in its passage by a paddle form of conveyor blades (not shown) working between beater-arms (not shown) within the trough which together create a consistent slurry of the pulverised seed and solvent/miscella. This slurry then falls by gravity through the discharge pipe 3 and proceeds to fill one of the series of contiguous chambers 12 on the continuous porous belt 10 disposed immediately beneath the discharge pipe 3 and lying above section a of the partitioned compartment 13. With the movement of the belt chamber 12 charged with slurry passes progressively from its position immediately above section a of the partitioned compartment to a position above section b of the partitioned compartment in which latter section a vacuum obtains. By virtue of this vacuum the fluid content of the slurry is induced to pass through the porous belt and perforated top 15 of the section b into the said section from whence it can be recovered. This removal of fluid is progressive as the slurry-charged chamber moves across the perforations in the top of section b. The movement of the continuous porous belt is controlled so that the maximum drainage is effected whilst each contiguous chamber 12 passes completely over section b. Under the influence of the vacuum there will be a tendency for the solids in the slurry to pack together and such packing or caking obviously retards or even prohibits extraction. As the contiguous chamber and its content of now partially exhausted meal passes progressively across the top of section c of the partitioned compartment the conditions are reversed because a positive pressure obtains in this section. The pressure obtaining in section c causes the compacted meal to be loosened and broken up and the finely divided material will tend to open out. Progressive movement of the continuous porous belt brings the contiguous chamber into a neutral position corresponding to section d at which stage further solvent or miscella is introduced into the contiguous chamber through the inlet port 19. The opened-out meal is thus brought into contact with the requisite clean solvent or miscella and further extraction of oils takes place, the application of differential pressures as between adjacent sections of the partitioned compartment being repeated in sections e and f.

It will be appreciated that the disposition of sections in the partitioned compartment corresponding to neutral, reduced and enhanced pressure zones may be repeated to order dependent upon the number of solvent washes deemed necessary to exhaust the meal.

After passing section f the continuous belt 10 carrying a chamber 12 with its content of now extracted or spent meal passes over the supporting drum 9 and the chamber 12 then becomes inverted with the result that the finely divided meal which has been opened out and blown from close contact with the continuous porous belt whilst passing progressively across section f falls by gravity into the discharge hopper 6 from whence it can be removed, if desired, to a plant of conventional type wherein the solvent saturated meal can be treated to yield a dry meal and a proportion of solvent recovered.

Various detail modifications may be introduced into both the method of using the apparatus and into the apparatus itself. For example, if desired, the temperature of the slurry in the enclosed trough can be raised by suitable jacketing of the trough to enhance rate and extent of extraction. Again, it is found convenient to utilise the air withdrawn from sections b and e, i. e. the vacuum sections, as a contribution to the positive pressure obtaining in sections c and f.

It will thus be seen that by subjecting vegetable matter containing oils, as exemplified by seeds, nuts or beans, to pulverisation and then intimately mixing the pulverised material with an extraction solvent to form a slurry and thereafter subjecting this slurry to repeated filtration, and re-washing under conditions of differential pressure, it is possible to achieve a satisfactory and economic extraction of oils from seeds, nuts and beans without having first to subject the raw material to specialised and costly initial treatments in order to retard the development of "fines," on the contrary, the present invention is essentially concerned with the extraction of oils from "fines" when presented for extraction in the form of a slurry.

I claim:

1. A method of extracting oils from vegetable matter which comprises the steps of thoroughly mixing together finely ground raw vegetable matter and an extraction solvent so as to form a slurry, subjecting the slurry to filtration by suction to separate miscella from the slurry, positively agitating the solids in the slurry compacted by said section and washing the slurry with further extraction solvent, and then repeating said suction, agitating and washing steps, the extraction solvent used in the first mentioned washing step being miscella separated from the slurry in the second mentioned suction step.

2. A method of extracting oils from vegetable matter which comprises the steps of thoroughly mixing together finely ground raw vegetable matter and an extraction solvent so as to form a slurry, then conveying said slurry through a plurality of zones in which the slurry is subjected successively to filtration by suction to separate miscella from the slurry, to positive agitation to loosen the solids in the slurry compacted by said suction, to washing with further extraction solvent and to at least one additional filtration by suction to separate further miscella.

3. A method of extracting oils from vegetable matter which comprises the steps of thoroughly mixing together finely ground raw vegetable matter and an extraction solvent so as to form a slurry, then conveying said slurry through a plurality of zones in which the slurry is subjected successively to filtration by suction to separate miscella from the slurry, to positive agitation to loosen the solids in the slurry compacted by said suction and to washing with further extraction solvent, and then the slurry is subjected again to said steps of filtration by suction, agitation and washing, the extraction solvent used in the first mentioned washing step being miscella recirculated from the second filtration by suction step.

4. A method of extracting oils from vegetable matter which comprises the steps of thoroughly mixing together finely ground raw vegetable matter and an extraction solvent so as to form a slurry, then conveying the said slurry through a plurality of zones of differential pressure in which it is subjected successively to filtration by suction whereby to separate miscella from the slurry, to positive pressure agitation whereby to break up the solids in the slurry compacted by the said suction, and to washing with further extraction solvent.

5. A method of extracting oils from vegetable matter which comprises the steps of thoroughly mixing together finely ground raw vegetable matter and an extraction solvent so as to form a slurry, then conveying the said slurry whilst disposed in the form of a series of contiguous pools through a plurality of zones of differential pressure during which passage each pool of slurry is subjected successively to filtration by suction whereby to separate miscella from the slurry, to positive pressure agitation whereby to break up the solids in the slurry compacted by the said suction, and to washing with further extraction solvent.

6. A method of extracting oils from vegetable matter which comprises the steps of thoroughly mixing together finely ground raw vegetable matter and an extraction solvent so as to form a slurry, conveying the said slurry whilst disposed in the form of a series of contiguous pools through a plurality of zones of differential pressure in which each pool of slurry is subjected successively to filtration by suction whereby to separate miscella from the slurry, to positive pressure agitation whereby to break up the solids in the slurry compacted by the said suction, and to washing with miscella recirculated from an advanced position in the cycle of operations.

7. A method of extracting oils from vegetable matter which comprises the steps of pulverising raw material to be extracted, thoroughly mixing together the pulverised material and an extraction solvent so as to form a slurry, conveying the said slurry through a plurality of zones of differential pressure in which it is subjected successively to filtration by suction whereby to separate miscella from the slurry, to positive pressure agitation whereby to break up the solids in the slurry compacted by the said suction, and to washing with further extraction solvent, and utilising air withdrawn from those zones in which the slurry is subjected to suction with which to boost the pressure developed in those zones in which the slurry is subjected to positive pressure agitation.

8. A method of extracting oils from vegetable matter which comprises the steps of pulverising the raw material to be extracted, thoroughly mixing together at an elevated temperature the pulverised raw material and an extraction solvent so as to form a slurry and then conveying the said pre-heated slurry through a plurality of zones of differential pressure in which it is subjected successively to filtration by suction, whereby to separate miscella from the slurry, to positive pressure agitation whereby to break up the solids in the slurry compacted by the said suction, and to washing with further extraction solvent.

9. A method of extracting oils from vegetable matter which comprises the steps of pulverising raw material to be extracted, thoroughly mixing together the pulverised raw material and an extraction solvent so as to form a slurry and then conveying the said slurry through a plurality of zones of differential pressure interrupted by at least one neutral zone in which the slurry is subjected successively to filtration by suction, to positive pressure agitation whereby to break up the solids in the slurry compacted by the said suction, and to washing with further extraction solvent whilst disposed in the neutral zone.

References Cited in the file of this patent
UNITED STATES PATENTS

| | | |
|---|---|---|
| 1,775,154 | Boykin | Sept. 9, 1930 |
| 2,614,911 | Bonotto | Oct. 21, 1952 |

UNITED STATES PATENT OFFICE

CERTIFICATE OF CORRECTION

Patent No. 2,850,511                                         September 2, 1958

Thomas Andrews

It is hereby certified that error appears in the above numbered patent requiring correction and that the said Letters Patent should read as corrected below.

In the heading to the printed specification, line 11, foreign filing date, for "October 20, 1949" read -- November 1, 1948 --.

Signed and sealed this 27th day of January 1959.

(SEAL)
Attest:

KARL H. AXLINE                                            ROBERT C. WATSON
Attesting Officer                                       Commissioner of Patents